May 13, 1941.   K. F. NYSTROM ET AL   2,241,418
RAILWAY TRUCK
Filed Oct. 31, 1938   2 Sheets-Sheet 1

INVENTORS
KARL F. NYSTROM
EDMUND S. BECKETTE
VERNON L. GREEN

BY Rodney Bedell
ATTORNEY

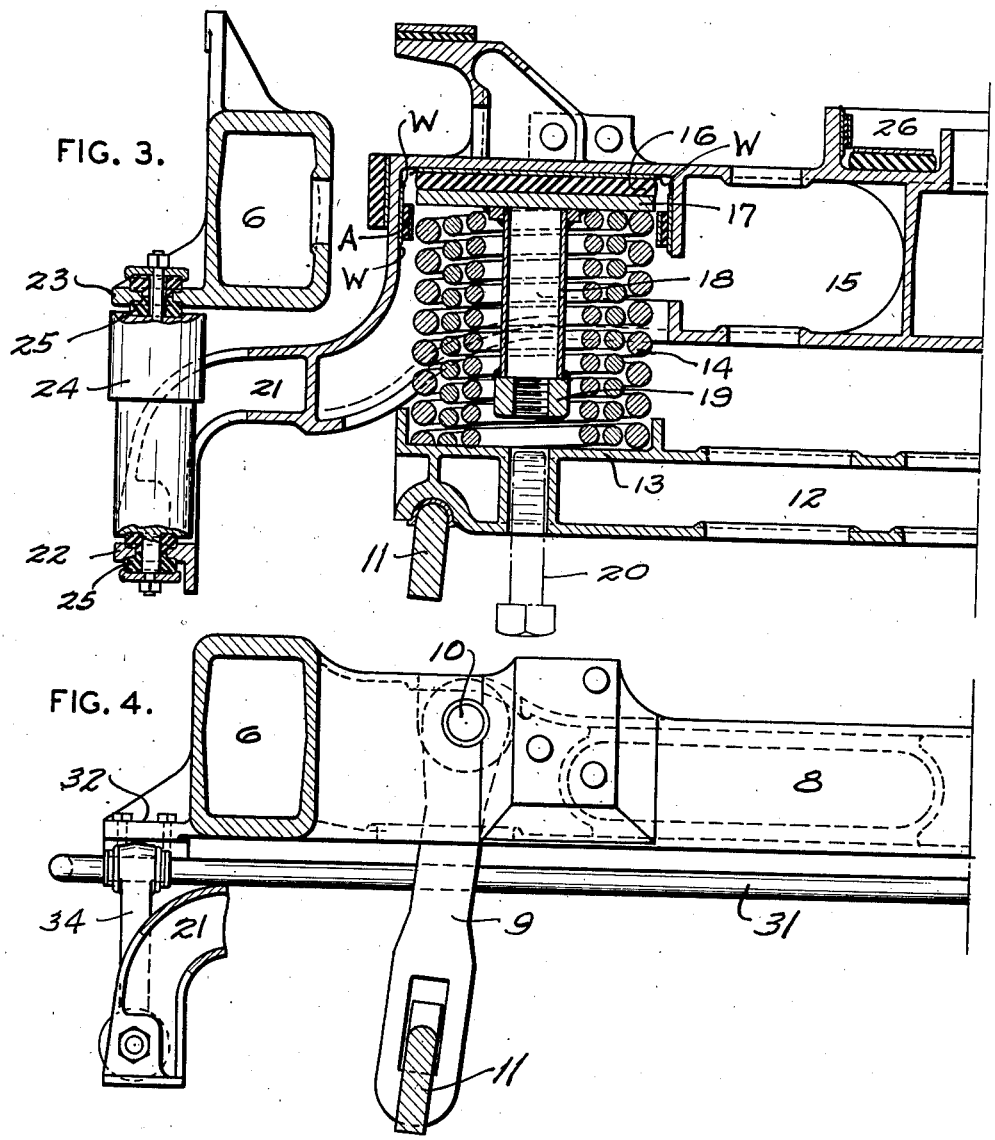

Patented May 13, 1941

2,241,418

UNITED STATES PATENT OFFICE 2,241,418

RAILWAY TRUCK

Karl F. Nystrom, Milwaukee, Wis., Edmund S. Beckette, East St. Louis, Ill., and Vernon L. Green, Milwaukee, Wis.; said Beckette assignor to General Steel Castings Corporation, Granite City, Ill., a corporation of Delaware Application October 31, 1938, Serial No. 237,820

6 Claims. (Cl. 105—190)

The invention relates to railway rolling stock and more particularly to trucks in which the bolster is spring supported from the truck frame.

When the bolster spring is to be assembled with the other truck parts or is to be removed from an assembled truck for replacement or for other purposes, it may be necessary to jack up the truck or the bolster or to combine a jacking and blocking operation between the spring support and the bolster so as to spread the same apart and relieve the spring from load before it can be removed.

The main object of the present invention is to eliminate the necessity of such jacking operations to facilitate manipulation of the bolster spring.

These and other detailed objects as will appear from the following specification are attained by the structure illustrated in the accompanying drawings, in which—

Figures 3 and 4 are vertical transverse sections on an enlarged scale taken on the corresponding section lines of Figure 1.

Figure 1:
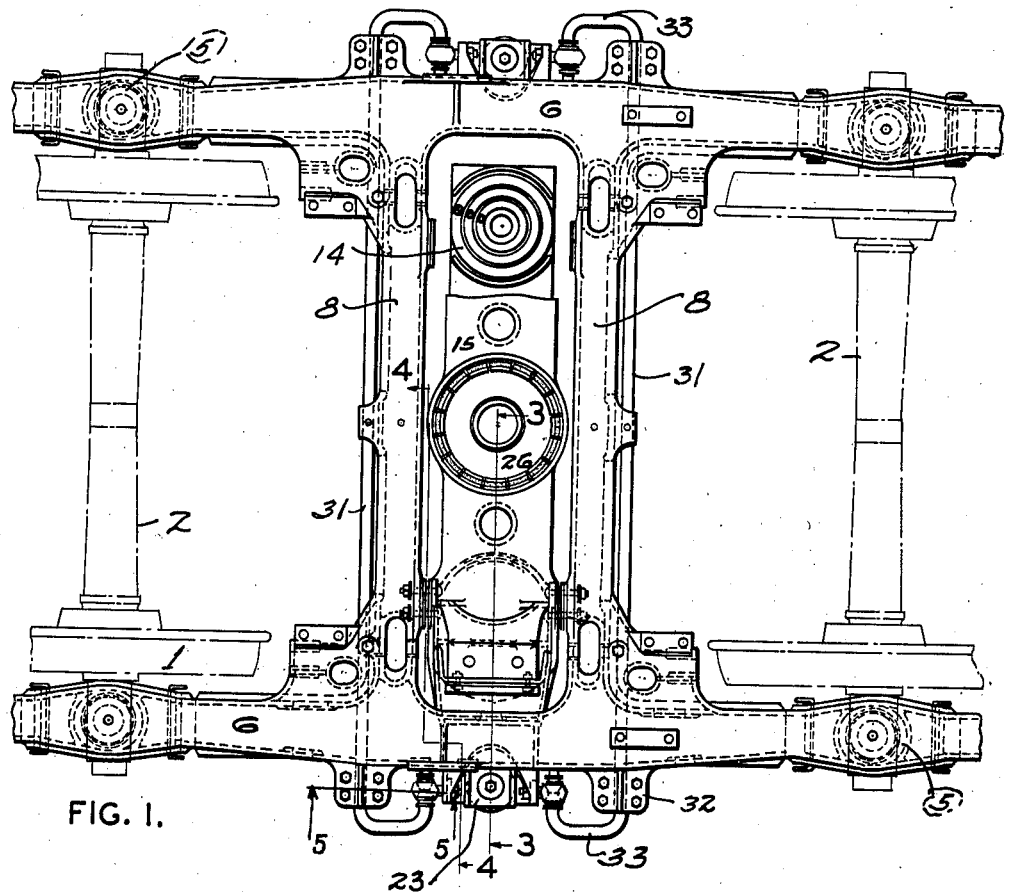
Figure 1 is a top view of the major part of a four-wheel truck, the end portions of the sides of the truck being broken away as they are unimportant and to enable the drawing to be made on a larger scale.
Figure 2:
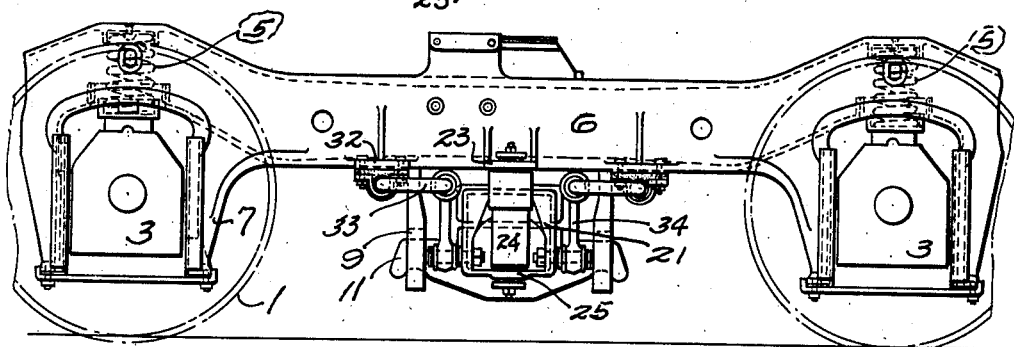
Figure 2 is a side elevation of the truck structure shown in Figure 1.
Figure 5:
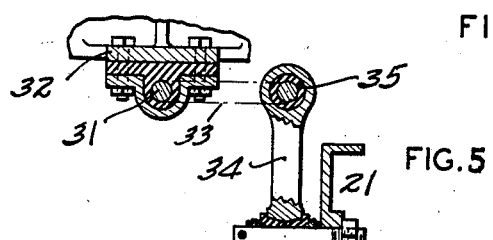
Figure 5 is a detail vertical section taken on the corresponding section line of Figure 1.

The truck includes the usual wheels 1, axles 2 and axle journal boxes 3. A coil spring 5, or a group of coil springs, is mounted upon each journal box and the truck frame rests upon springs 5. The truck frame comprises wheel pieces 6 extending over the axle boxes, pedestal legs 7 depending from wheel pieces 6, transverse transoms 8 spaced apart, and other details customary in such frames but not enumerated here except as particularly mentioned below.

Suspended from the end portions of transoms 8 where they merge with wheel pieces 6 are pairs of swing hangers 9 pivotally mounted in the transoms by pins 10, the links of each pair being connected by a cross bar 11. A spring plank 12 extends between cross bars 11 and has upwardly facing seats 13 for mounting the bolster coil springs 14. The main body part of bolster 15 is located at substantially the same level as wheel pieces 6 and its end portions include downwardly facing spring cap portions for receiving the upper ends of springs 14. Preferably each cap portion has applied thereto a rubber disc 16 and a rubber annulus A. Each of these rubber members is bonded to a plate which may be welded to the bolster casting at W. Relative lateral movement of the bolster and spring 14 is limited by the contact of the spring with the rubber annulus A. Disc 16 receives the thrust of spring 14 through a cap plate 17 which is provided with a downward extension 18 carrying a nut 19 on its lower end. Spring plank 12 is provided with an opening immediately beneath nut 19 and adapted to receive a bolt 20. The bolster may be supported on blocks or jacks and bolt 20 inserted through the opening in the spring plank and threaded into nut 19.

When the head of bolt 20 strikes the lower face of spring plank 12, further rotation of the bolt will draw elements 19, 18, and 17 downwardly, compressing spring 14 to facilitate the removal of the bolster, bolster spring, or spring plank from the truck.

Bolster 15 is provided with downwardly and outwardly extending arms 21 projecting beneath wheel pieces 6 and terminating in flanges 22 preferably in vertical alignment with brackets 23 formed on the outer faces of wheel pieces 6. Shock absorber devices 24 are secured to bolster flanges 22 and frame brackets 23 and coact with the frame and bolster to control relative vertical movements thereof by absorbing forces applied to the parts, especially violent and sudden forces which otherwise would permit free compression and recoil of springs 14. The shock absorbers will also function to break up harmonic synchronization of springs 14 and springs 5 and thereby function indirectly to dampen the action of the latter-mentioned springs.

The truck bolster is provided with a center plate structure 26 provided with rubber elements on its upwardly and inwardly facing surfaces for yieldingly mounting a body center plate (not shown).

To stabilize the vertical movement of opposite end portions of the bolster there are provided torque rods 31 journaled in brackets 32 on wheel pieces 6, and each torque rod has arms 33 at its opposite ends extending towards bolster 15 but not directly contacting the same. An upright link 34 has a pivotal connection with the inner end of each arm 33, the pivot axis extending transversely of the truck, and the lower end of each link 34 is pivotally connected with a bolster arm 21, the pivot axis extending longitudinally of the truck. Preferably each of these pivotal connections includes rubber mounting elements 35 which take up any play between the parts and break the metal to metal line of contact between the bolster and the frame and accommodate angular movement between the bolster and the stabilizer structure. The pivotal connections between the stabilizer parts and the frame and the bolster avoid the use of sliding joints which have been used in some cross stabilizing arrangements previously proposed.

The bolt and nut arrangement for compressing the bolster springs further facilitates the removal and re-application of shock absorbers by making it possible to take the load off the same irrespective of whether or not it is desired to remove the spring plank and the spring assembly from the truck.

The rubber structure embodied in the center plate, spring cap and bolster ends constitutes the subject matter of a divisional application filed by the present applicants February 15, 1940, Serial No. 318,982. The mechanical shock absorbing and stabilizing structure constitutes the subject matter of another divisional and continuing application filed by the present applicants May 6, 1940, Serial No. 333,608.

It will be understood that different types of bolster cross stabilization and shock absorber structures may be substituted for those shown, and modifications in the details of the frame, bolster and other parts may be made without departing from the spirit of the invention and exclusive use of such variations as come within the scope of the claims is contemplated.

What is claimed is:

1. In a railway truck, a bolster, a coil spring supporting said bolster, a member for seating said spring and having an unobstructed opening facing downwardly substantially in line with the axis of said spring, a detachable bolt insertible through said opening from beneath the member into the spring coil with its head disposed to engage the lower face of said member, an element overlying said spring with a part threaded to receive said bolt whereby the latter may be rotated to engage said part and draw said element towards said member to compress said spring.

2. In a railway truck having a frame with swing hangers pivotally suspended therefrom and supporting a spring plank mounting a coil spring carrying a bolster, a cap overlying the spring and having a member extending downwardly through the spring coils and provided with an internal thread nut-like element, there being a vertical unobstructed opening in said spring plank immediately beneath said element arranged to receive a detachable bolt passed upwardly through said opening to engage said element and to seat its head against the bottom of the spring plank to compress said spring independently of the bolster and its load.

3. In a railway truck having a frame with swing hangers pivotally suspended therefrom and supporting a spring plank with bolster spring structure mounted thereon, a cap overlying said spring structure and having a depending part provided with an internally threaded nut-like element adjacent to said spring plank, there being a vertical unobstructed opening in said spring plank immediately beneath said element arranged to receive a detachable bolt passed upwardly through said spring plank opening to be threaded into said element and to seat its head against the bottom of the spring plank to compress said head independently of the bolster and its load.

4. In a railway truck having a frame and a member carried thereby and mounting a spring carrying a bolster, a cap overlying the spring and including a part having a vertically disposed threaded aperture, there being a vertical unobstructed opening in said member immediately beneath said aperture arranged to receive a detachable bolt passed upwardly from beneath said member to be threaded into said aperture and to seat its head against the bottom of said member to compress said spring independently of the bolster and its load.

5. In a railway truck, a frame, a spring seating member carried thereby, a spring mounted on said member, a bolster supported on said spring, there being a vertically disposed opening extending through said member and unobstructed from below said member, a detachable bolt inserted through said opening from beneath said member with its head disposed to engage the lower face of said member, and an element overlying said spring with a part threaded to receive said bolt whereby the latter may be rotated to engage said part and draw said element towards said member and compress said spring.

6. In a railway truck having a frame with swing hangers pivotally suspended therefrom and supporting a spring plank with bolster spring structure mounted thereon, a cap overlying said spring structure and having a depending part terminating a relatively short distance above said spring plank, and means operable manually from below said spring plank for engaging said spring plank and part to draw them towards each other and thereby compress said spring independently of the bolster and its load and facilitate removal from the truck of the bolster supported on said spring structure.

KARL F. NYSTROM.
VERNON L. GREEN.
EDMUND S. BECKETTE.